US009255805B1

(12) United States Patent
Ferguson et al.

(10) Patent No.: US 9,255,805 B1
(45) Date of Patent: *Feb. 9, 2016

(54) POSE ESTIMATION USING LONG RANGE FEATURES

(71) Applicant: Google Inc., Mountain View, CA (US)

(72) Inventors: David I. Ferguson, San Francisco, CA (US); David Harrison Silver, Millbrae, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/716,097

(22) Filed: May 19, 2015

Related U.S. Application Data

(63) Continuation of application No. 13/936,522, filed on Jul. 8, 2013, now Pat. No. 9,062,979.

(51) Int. Cl.
G06F 19/00 (2011.01)
G01C 21/28 (2006.01)
G01S 13/88 (2006.01)
G01C 21/30 (2006.01)

(52) U.S. Cl.
CPC .................................... G01C 21/30 (2013.01)

(58) Field of Classification Search
None
See application file for complete search history.

(56) References Cited

U.S. PATENT DOCUMENTS

| 7,202,776 | B2 | 4/2007 | Breed |
| 7,979,172 | B2 | 7/2011 | Breed |
| 8,346,480 | B2 | 1/2013 | Trepagnier et al. |
| 8,949,016 | B1 | 2/2015 | Ferguson et al. |
| 2008/0243378 | A1 | 10/2008 | Zavoli |
| 2009/0228204 | A1 | 9/2009 | Zavoli et al. |
| 2011/0241857 | A1 | 10/2011 | Brandenburger et al. |
| 2012/0242972 | A1 | 9/2012 | Wee |
| 2012/0310466 | A1 | 12/2012 | Fairfield et al. |
| 2013/0058527 | A1 | 3/2013 | Peynot |
| 2013/0197736 | A1 | 8/2013 | Zhu et al. |
| 2013/0253753 | A1 | 9/2013 | Burnette et al. |
| 2014/0104051 | A1* | 4/2014 | Breed ................ G06K 9/00791 340/435 |

* cited by examiner

Primary Examiner — James Trammell
Assistant Examiner — Demetra Smith-Stewart
(74) Attorney, Agent, or Firm — Lerner, David, Littenberg, Krumholz & Mentlik, LLP

(57) ABSTRACT

Aspects of the present disclosure relate to using an object detected at long range to increase the accuracy of a location and heading estimate based on near range information. For example, an autonomous vehicle may use data points collected from a sensor such as a laser to generate an environmental map of environmental features. The environmental map is then compared to pre-stored map data to determine the vehicle's geographic location and heading. A second sensor, such as a laser or camera, having a longer range than the first sensor may detect an object outside of the range and field of view of the first sensor. For example, the object may have retroreflective properties which make it identifiable in a camera image or from laser data points. The location of the object is then compared to the pre-stored map data and used to refine the vehicle's estimated location and heading.

20 Claims, 14 Drawing Sheets

POSE ESTIMATION USING LONG RANGE FEATURES

CROSS-REFERENCE TO RELATED APPLICATIONS

The present application is a continuation of U.S. patent application Ser. No. 13/936,522, filed Jul. 8, 2013, the disclosure of which is incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual driving mode (where the operator exercises a high degree of control over the movement of the vehicle) to an autonomous driving mode (where the vehicle essentially drives itself) to modes that lie somewhere in between.

When operating in an autonomous mode, these vehicles need to be able to accurately estimate their relative geographic location in the world. To do this, autonomous vehicles typically combine inertial pose estimation systems (e.g., using gyros, accelerometers, wheel encoders, GPS) and map-based localization approaches (e.g. generating a local map using onboard sensors and comparing these to a stored map to estimate where the vehicle is in the stored map). These approaches may result in noise or uncertainty in both the inertial pose estimation and localization stages that makes it difficult to achieve very high accuracy results. In addition, these approaches tend to focus on near range information so that a local map can be built up and compared against a stored map or because this is all that the sensor can detect with sufficient density of data points.

BRIEF SUMMARY

Aspects of the disclosure provide a method. The method includes receiving data collected by a first sensor while a vehicle is driving on a roadway. The first sensor has a first sensor range. The received data from the first sensor is used to generate a map of the vehicle's environment within the first sensor range. A processor estimates the vehicle's geographic location and heading by comparing the generated map to a stored map identifying the geographic locations of objects including reference objects having particular retroreflective, brightness, or intensity characteristics. The method also includes receiving data collected by a second sensor while the vehicle is driving on the roadway. The second sensor has a second sensor range greater than the first sensor range. A reference object having a particular retroreflective, brightness, or intensity characteristic is identified from the data collected by the second sensor outside of the first sensor range; correlating the identified reference object to a reference object of the stored map based on the particular retroreflective, brightness, or intensity characteristic. The correlation is used to refine the estimated heading of the vehicle.

In one example, the estimated geographic location includes latitude, longitude and altitude coordinates. In another example, the estimated geographic location includes Coordinated Universal Time coordinates. In another example, the method also includes using the correlation to refine the estimated geographic location of the vehicle. In another example, the first sensor is a laser and the second sensor is a different laser. In another example, the first sensor is a laser and the second sensor is a camera. In another example, estimating the vehicle's geographic location and heading is further based on a previous geographic location and heading estimate.

Another aspect of the disclosure provides a system. The system includes a first sensor configured to collect data while a vehicle is driving on a roadway. The first sensor has a first sensor range. The system also includes a second sensor configured to collect data while the vehicle is driving on the roadway. The second sensor having a second sensor range greater than the first sensor range. The system also includes memory storing a map identifying the geographic locations of objects including reference objects having particular retroreflective, brightness, or intensity characteristics as well as a processor. The processor is configured to access the memory; receive data from the first sensor and the second sensor; use the received data from the first sensor to generate a map of the vehicle's environment within the first sensor range; estimate the vehicle's geographic location and heading by comparing the generated map to the; identify a reference object having a particular retroreflective, brightness, or intensity characteristic from the data collected by the second sensor outside of the first sensor range; correlate the identified reference object to a reference object of the stored map based on the particular retroreflective, brightness, or intensity characteristic; and use the correlation to refine the estimated heading of the vehicle.

In one example, the estimated geographic location includes latitude, longitude and altitude coordinates. In another example, the estimated geographic location includes Coordinated Universal Time coordinates. In another example, the processor is also configured to use the correlation to refine the estimated geographic location of the vehicle. In another example, the first sensor is a laser and the second sensor is a different laser. In another example, the first sensor is a laser and the second sensor is a camera. In another example, the processor is further configured to estimate the vehicle's geographic location and heading further based on a previous geographic location and heading estimate.

A further aspect of the disclosure provides a non-transitory, tangible computer-readable storage medium on which computer readable instructions of a program are stored. The instructions, when executed by a processor, cause the processor to perform a method. The method includes receiving data collected by a first sensor while a vehicle is driving on a roadway, the first sensor having a first sensor range; using the received data from the first sensor to generate a map of the vehicle's environment within the first sensor range; estimating the vehicle's geographic location and heading by comparing the generated map to a stored map identifying the geographic locations of objects including reference objects having particular retroreflective, brightness, or intensity characteristics; receiving data collected by a second sensor while the vehicle is driving on the roadway, the second sensor having a second sensor range greater than the first sensor range; identifying a reference object having a particular retroreflective, brightness, or intensity characteristic from the data collected by the second sensor outside of the first sensor range; correlating the identified reference object to a reference object of the stored map based on the particular retroreflective, brightness, or intensity characteristic; and using the correlation to refine the estimated heading of the vehicle.

In one example, the estimated geographic location includes latitude, longitude and altitude coordinates. In another example, the estimated geographic location includes Coordinated Universal Time coordinates. In another example, the method also includes using the correlation to refine the estimated geographic location of the vehicle. In another example, the first sensor is a laser and the second sensor is a different laser. In another example, the first sensor is a laser and the second sensor is a camera. In another example, estimating the vehicle's geographic location and heading is further based on a previous geographic location and heading estimate.

DETAILED DESCRIPTION

The disclosure relates generally to using an object detected at long range to increase the accuracy of a location and heading estimate based on near range information. For example, an autonomous vehicle may use data points collected from a sensor such as a laser to generate an environmental map of environmental features around the vehicle. The environmental map may be then compared to pre-stored map data to determine the vehicle's geographic location and heading (for example, latitude, longitude, and altitude coordinates and heading).

A second sensor, such as a laser or camera, having a longer range than the first sensor may detect an object outside of the range and field of view of the first sensor used to generate the environmental map. For example, the object may have retroreflective, brightness, or intensity properties which make it identifiable in a camera image or from laser data points at longer ranges, for example, 50, 75, 100, 150, 200 meters or more. The location of the object may then be compared to the pre-stored map data and used to refine the vehicle's estimated location and heading.

Figure 1:
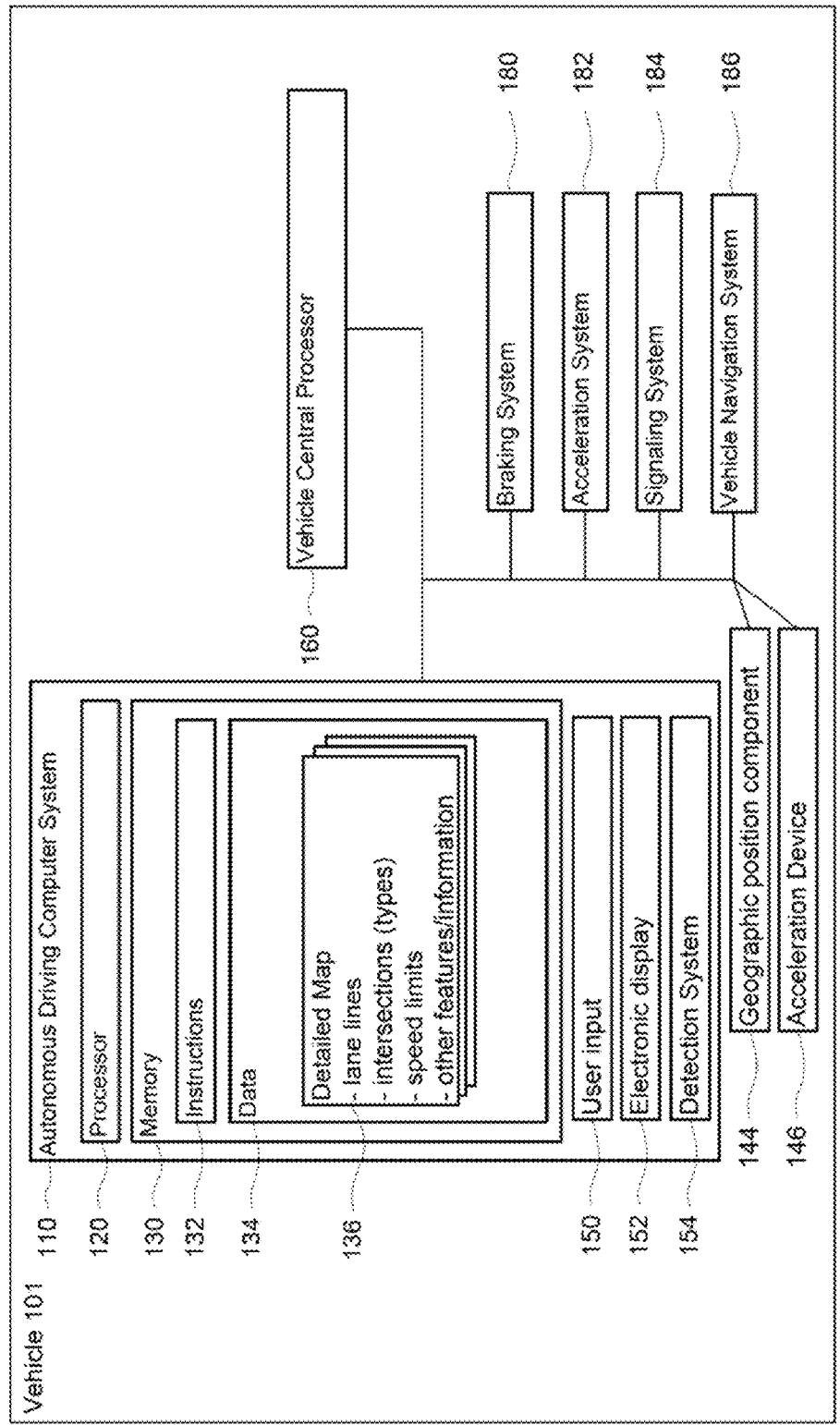
FIG. 1 is a functional diagram of a system in accordance with aspects of the disclosure.

As shown in FIG. 1, an autonomous driving system 100 associated with an autonomous vehicle. In this regard, vehicle 101 may include an autonomous vehicle. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 152 (e.g., a monitor having a screen, a small LCD touch-screen or any other electrical device that is operable to display information), user input 150 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
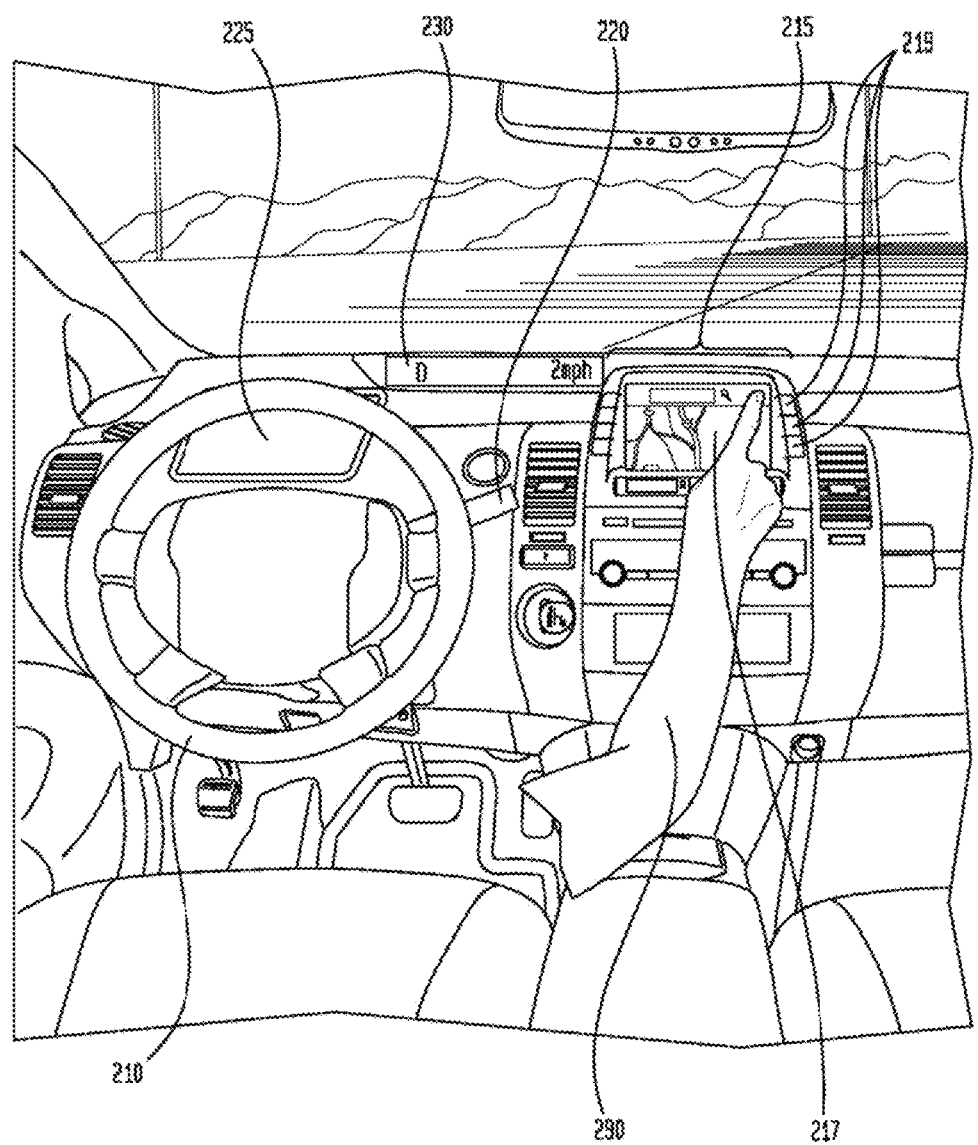
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (which may be a part of electronic display 152), or button inputs 219, for activating or deactivating one or more autonomous driving modes and for enabling a driver or passenger 290 to provide information, such as a navigation destination, to the autonomous driving computer 110.

The autonomous driving computing system may be capable of communicating with various components of the vehicle. For example, returning to FIG. 1, computer 110 may be in communication with the vehicle's central processor 160 and may send and receive information from the various systems of vehicle 101, for example the braking system 180, acceleration system 182, signaling system 184, and navigation system 186 in order to control the movement, speed, etc. of vehicle 101. In one example, the vehicle's central processor 160 may perform all of the functions of a central processor in a non-autonomous computer. In another example, processor 120 and 160 may comprise a single processing device or multiple processing devices operating in parallel.

In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it, which can often be determined with better accuracy than absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous driving mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system 154 may include lasers, sonar, radar, cameras or any other detection devices which record data which may be processed by computer 110. For example, if the vehicle is a small passenger vehicle, the car may include a laser mounted on the roof or other convenient location.

Figure 3:
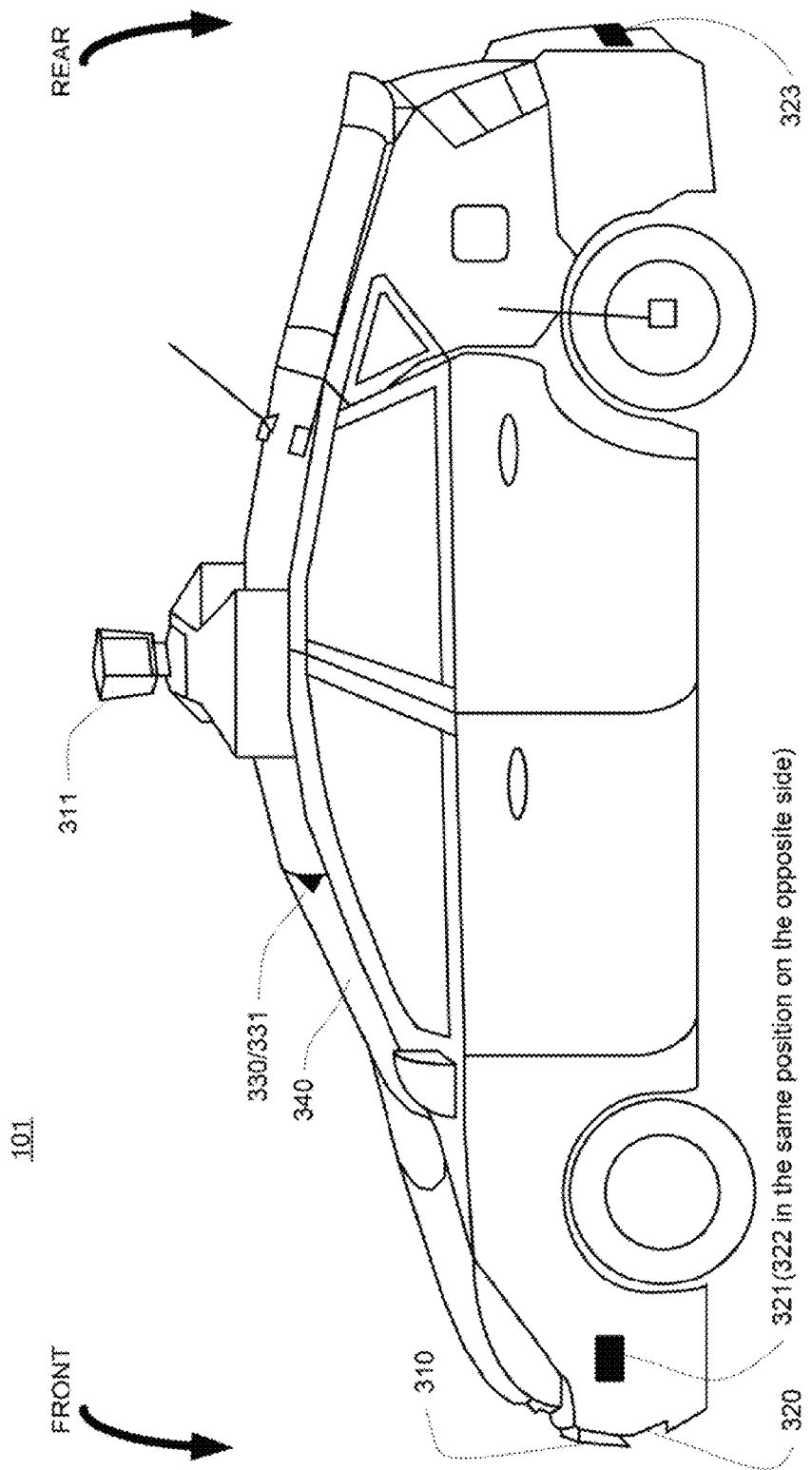
FIG. 3 is an exterior of an autonomous vehicle in accordance with aspects of the disclosure.

As shown in FIG. 3, vehicle 101 may include a small passenger vehicle having lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 101 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 101 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

Figure 4A:
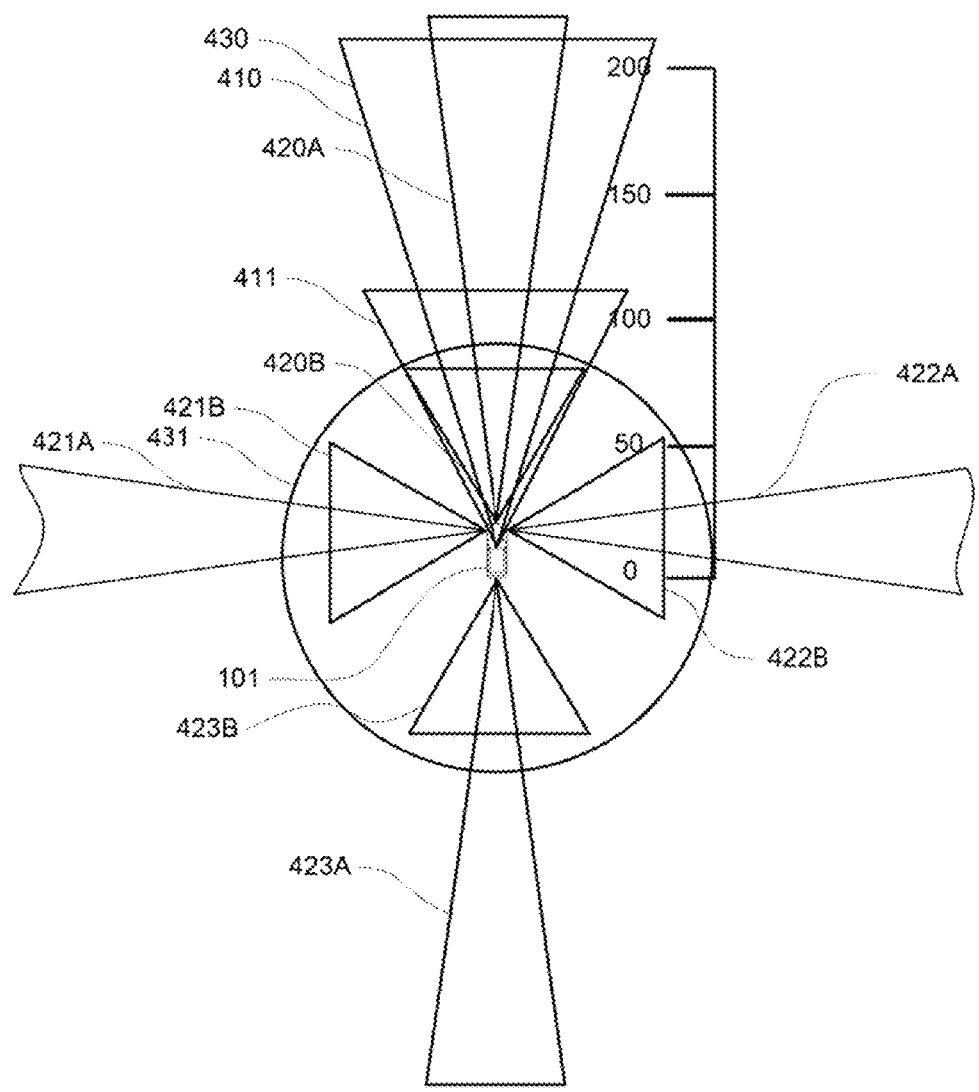
FIGS. 4A-D are diagrams of an autonomous vehicle in accordance with aspects of the disclosure.

Each sensor may be associated with a particular sensor field of view in which the sensor may be used to detect objects. FIG. 4A is a top-down view of the approximate sensor fields of the various sensors. FIG. 4B depicts the approximate sensor fields 410 and 411 for lasers 310 and 311, respectively based on the fields of view for these sensors. For example, sensor field 410 includes an approximately 30 degree horizontal field of view for approximately 200 meters, and sensor field 411 includes a 360 degree horizontal field of view for approximately 80 meters.

Figure 4D:
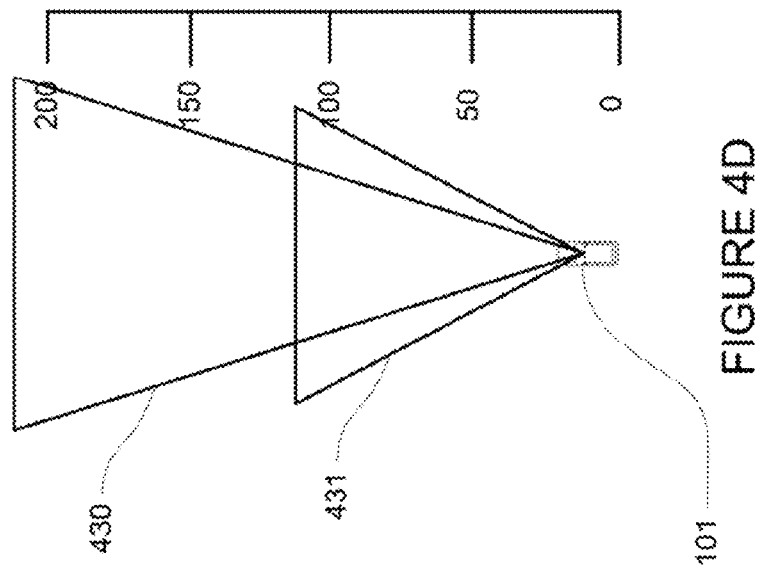
Figure 4B:
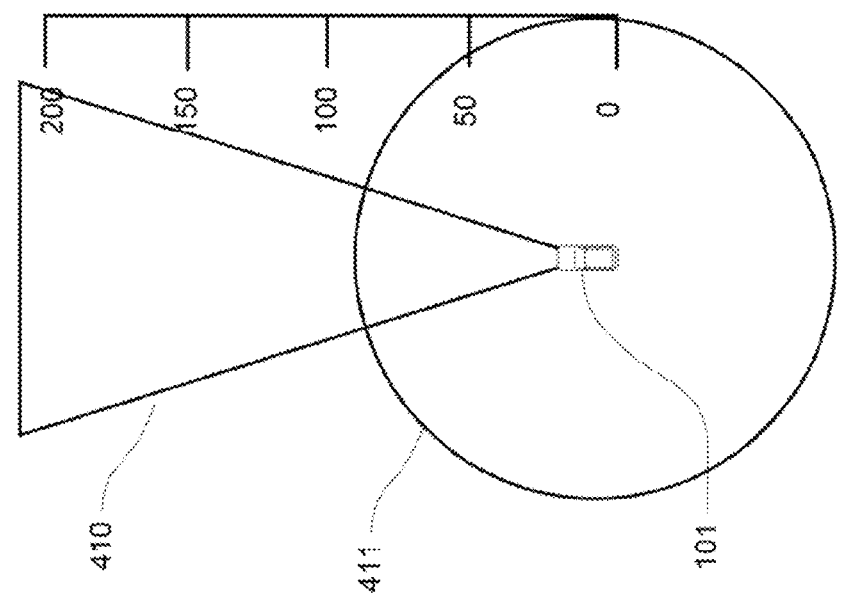
Figure 4C:
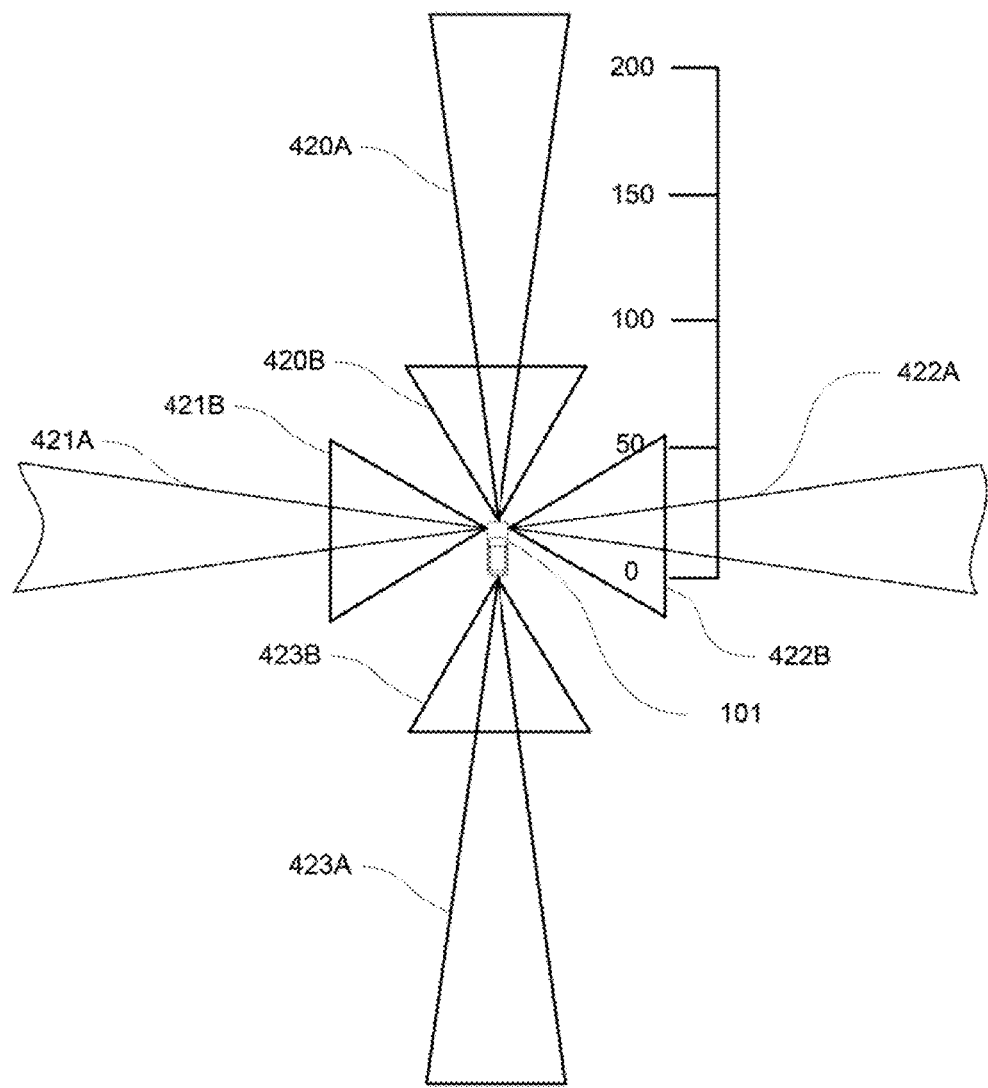

FIG. 4C depicts the approximate sensor fields 420A-423B and for radar detection units 320-323, respectively, based on the fields of view for these sensors. For example, radar detection unit 320 includes sensor fields 420A and 420B. Sensor field 420A includes an approximately 18 degree horizontal field of view for approximately 200 meters, and sensor field 420B includes an approximately 56 degree horizontal field of view for approximately 80 meters. Similarly, radar detection units 321-323 include sensor fields 421A-423A and 421B-423B. Sensor fields 421A-423A include an approximately 18 degree horizontal field of view for approximately 200 meters, and sensor fields 421B-423B include an approximately 56 degree horizontal field of view for approximately 80 meters. Sensor fields 421A and 422A extend passed the edge of FIGS. 4A and 4C.

FIG. 4D depicts the approximate sensor fields 430-431 cameras 330-331, respectively, based on the fields of view for these sensors. For example, sensor field 430 of camera 330 includes a field of view of approximately 30 degrees for approximately 200 meters, and sensor field 431 of camera 430 includes a field of view of approximately 60 degrees for approximately 100 meters.

In addition to the sensors described above, the computer may also use input from other sensors and features typical to non-autonomous vehicles. For example, these other sensors and features may include tire pressure sensors, engine temperature sensors, brake heat sensors, break pad status sensors, tire tread sensors, fuel sensors, oil level and quality sensors, air quality sensors (for detecting temperature, humidity, or particulates in the air), door sensors, lights, wipers, etc. This information may be provided directly from these sensors and features or via the vehicle's central processor 160.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, vegetation, or other such objects and information.

In some examples, the detailed map information may include information about reference objects. These reference objects may include objects which may be detected at relatively long distances by the autonomous vehicle's sensors, such as road signs, bright lights, or any other objects having retroreflective, high intensity, or high brightness characteristics. The retroreflective, intensity, and brightness characteristics necessary for an object to be a reference object may be selected based on the characteristics of the vehicle's sensors as discussed in more detail below. The detailed map information may thus include the location of these reference objects as well as information about the retroreflective, intensity, or brightness characteristics of the aforementioned objects.

Figure 5:
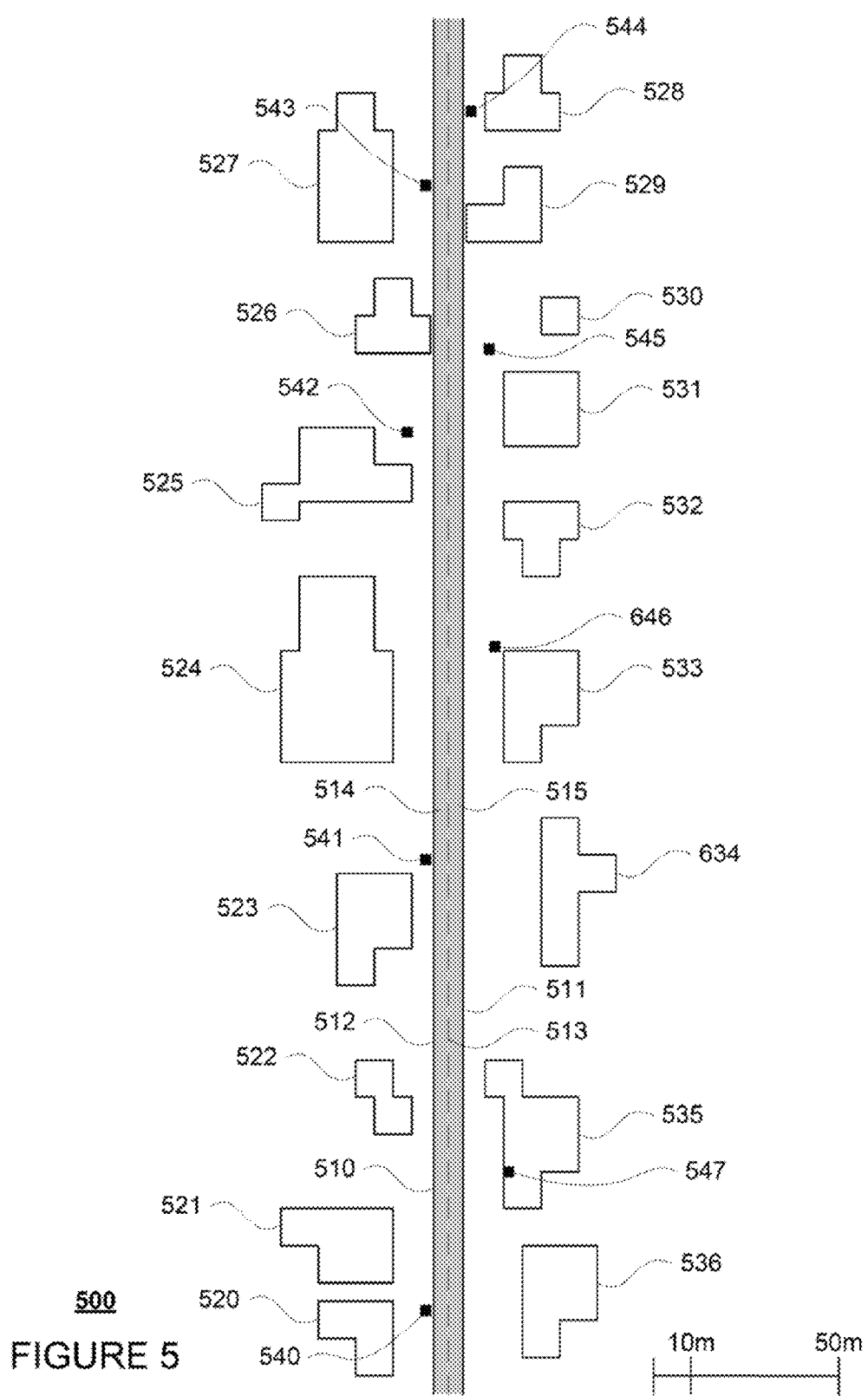
FIG. 5 is a birds-eye view of an area around a roadway in accordance with aspects of the disclosure.

FIG. 5 is a birds-eye view of an area 500 along a roadway 510. Roadway 510 includes lane lines 511 and 512 defining the outer edges of the roadway as well as dashed lane line 513 between southbound lane 514 and northbound lane 515. Area 500 also includes objects 520-536 which may include vegetation (trees, shrubs, etc.), water (ponds, lakes, streams, etc.) parking lots, or structures (buildings, parking decks, monuments, etc.). In this example, area 500 also includes objects 540-547 which may include signs, bright lights, or other features having retroreflective, high intensity, or high brightness characteristics.

Figure 6:
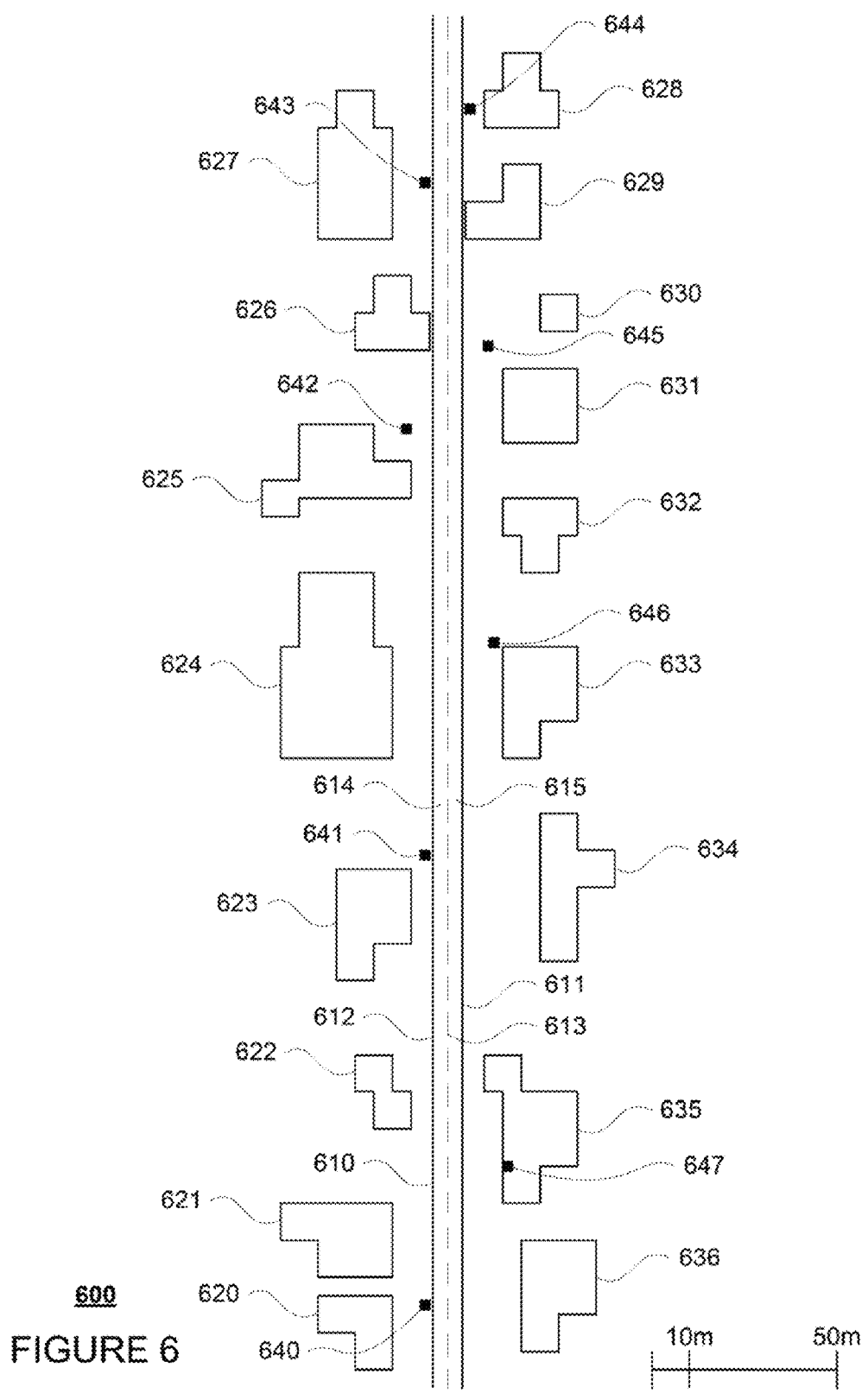
FIG. 6 is an example of map data in accordance with aspects of the disclosure.

FIG. 6 is an example of a portion 600 of detailed map information 136 for the area 500 of FIG. 5. In this example, the portion 600 includes a roadway feature 610 representing roadway 510. Lane line features 611 and 612 represent lane lines 511 and 512, respectively. Dashed lane line 613 represents dashed lane line 513 between southbound lane feature 614 and northbound lane feature 615 representing southbound lane 514 and northbound lane 515, respectively. Portion 600 also includes object features 620-636 representing objects 520-536 as well as reference object features 640-647 representing objects 540-547. Reference object features 640-647 may also include or be associated with information identifying the retroreflective, intensity, or brightness characteristics of objects 540-547 as described above.

The map information may also include three-dimensional terrain maps incorporating one or more of objects listed above. For example, the vehicle may determine that another object, such as a vehicle, is expected to turn based on real-time data (e.g., using its sensors to determine the current GPS position of another vehicle and whether a turn signal is blinking) and other data (e.g., comparing the GPS position with previously-stored lane-specific map data to determine whether the other vehicle is within a turn lane).

Although the detailed map information 136 is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location whether or not it is linked to other related features. For example, a stop sign may be linked to a road and an intersection. In some examples, the associated data may include grid-based indices of a roadgraph to promote efficient lookup of certain roadgraph features.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, an autonomous vehicle may be driving along a roadway. A first sensor associated with the autonomous vehicle may generate data used by the vehicle's computer to generate a map of the vehicle's environment. For example, using laser data collected by laser 310, computer 101 may detect objects within the range of the laser. Computer 110 may use the range and intensity data from the laser to generate the environmental map. In other words, computer 110 may construct a three-dimensional model of the objects detected from the laser data. The locations of the objects in this map may be defined by a coordinate system relative to the autonomous vehicle (or the first sensor).

Figure 7:
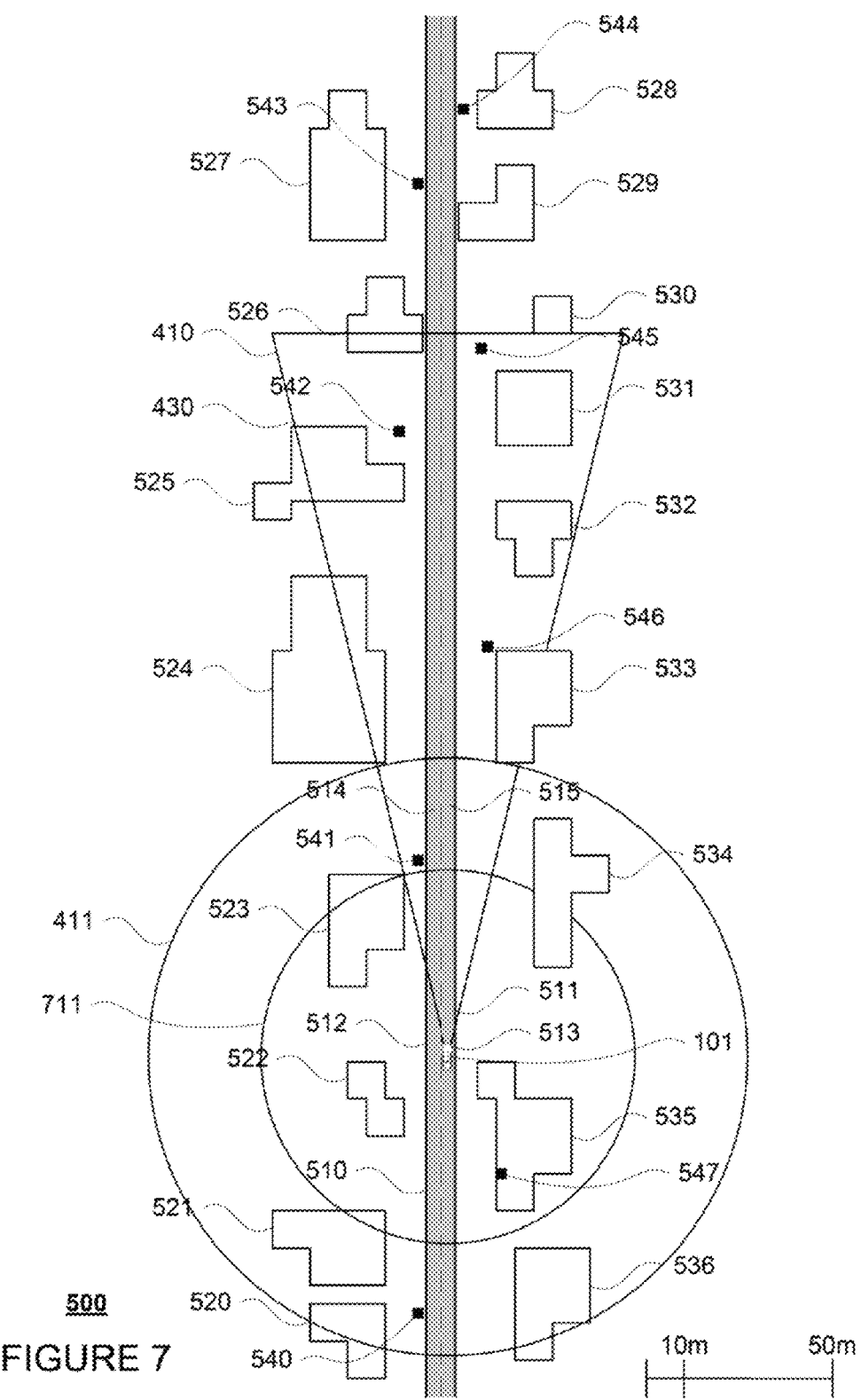
FIG. 7 is another birds-eye view of an area around a roadway in accordance with aspects of the disclosure.

FIG. 7 is an example of area 500 in which vehicle 101 is being driven in an autonomous mode along roadway 510. In this example, sensor fields 411 and 410 for lasers 310 and 311 are shown. In the example of FIG. 7, sensor field 410 may also represent sensor field 430 of camera 330 as these fields are similar in dimension. While laser 310 may have a range of 80 meters, the farther from the laser 310, the data points from the laser become less reliable and less dense. In this regard, while sensor field 411 has a range of 80 meters for 360 degrees, computer 110 may utilize a smaller portion of this sensor field in order to have a sufficient amount of data per square meter to generate a useful map. For example, at 50 meters, shown by sensor field 711, computer 110 may receive data points from laser 310 sufficient to generate an environmental map of vehicle 101's environment accurate to 25 centimeters. In this regard, the area of the environmental map generated by computer 110 may depend upon the accuracy and range of the sensor. In this example, because of the drop off in reliable data points, data points beyond a particular distance, here 50 meters, may be ignored when generating this initial environmental map.

Figure 8:
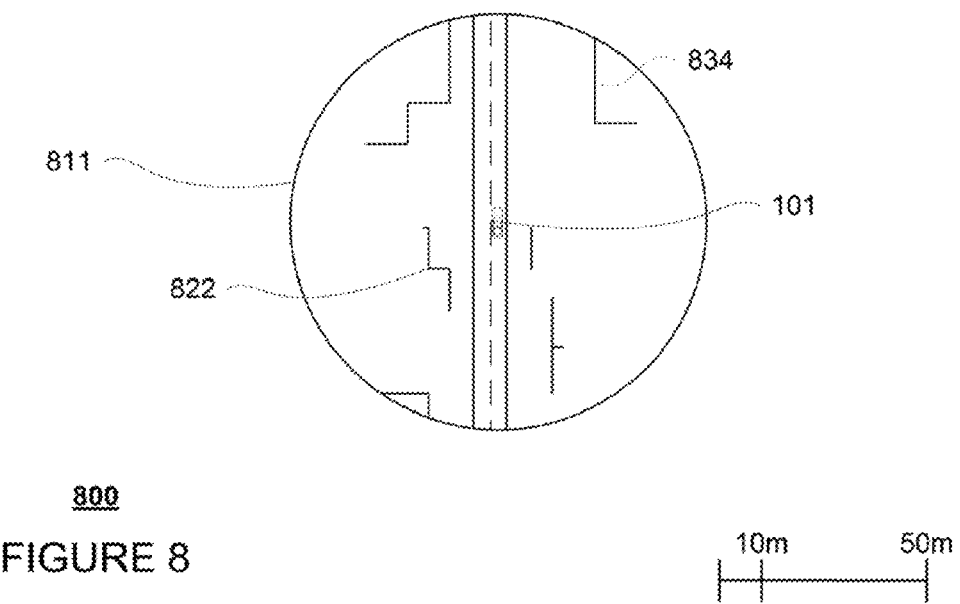
FIG. 8 is a diagram of example sensor data in accordance with aspects of the disclosure.

FIG. 8 is an example 800 of an environmental map 811 generated from laser data collected from laser 310 within sensor field 711 while vehicle 101 is at the location of FIG. 7. This birds-eye view demonstrates that the laser data for a single 360 degree scan covers only locations within the line of sight of the laser 310. Because of this, laser 310, while very accurate, cannot "see" behind or around objects without moving past or around them. Thus, as an example, computer 110 receives data for objects 822 and 834 corresponding to only a portion of objects 522 and 534 (shown in FIG. 5).

The autonomous vehicle may compare the environmental map to the stored detailed map information to determine the autonomous vehicle's relative position and heading. As noted above, the locations of the objects in the environmental map may be defined by a coordinate system relative to the autonomous vehicle (or the first sensor) while the locations of the objects and features in the detailed map information may be defined by a different coordinate system. As an example, the locations of the objects and features in the detailed map information may be defined by latitude, longitude and altitude coordinates. By correlating features from the environmental map to the detailed map information, the autonomous vehicle may identify the latitude, longitude, and altitude of the objects of the environmental map. In addition, once the latitude, longitude, and altitude coordinates of the objects of the environmental map are determined, the autonomous vehicle's latitude, longitude, altitude coordinates and heading may be estimated, for example, by converting the coordinate system relative to the autonomous vehicle (or the first sensor) to latitude and longitude coordinates.

Figure 9:
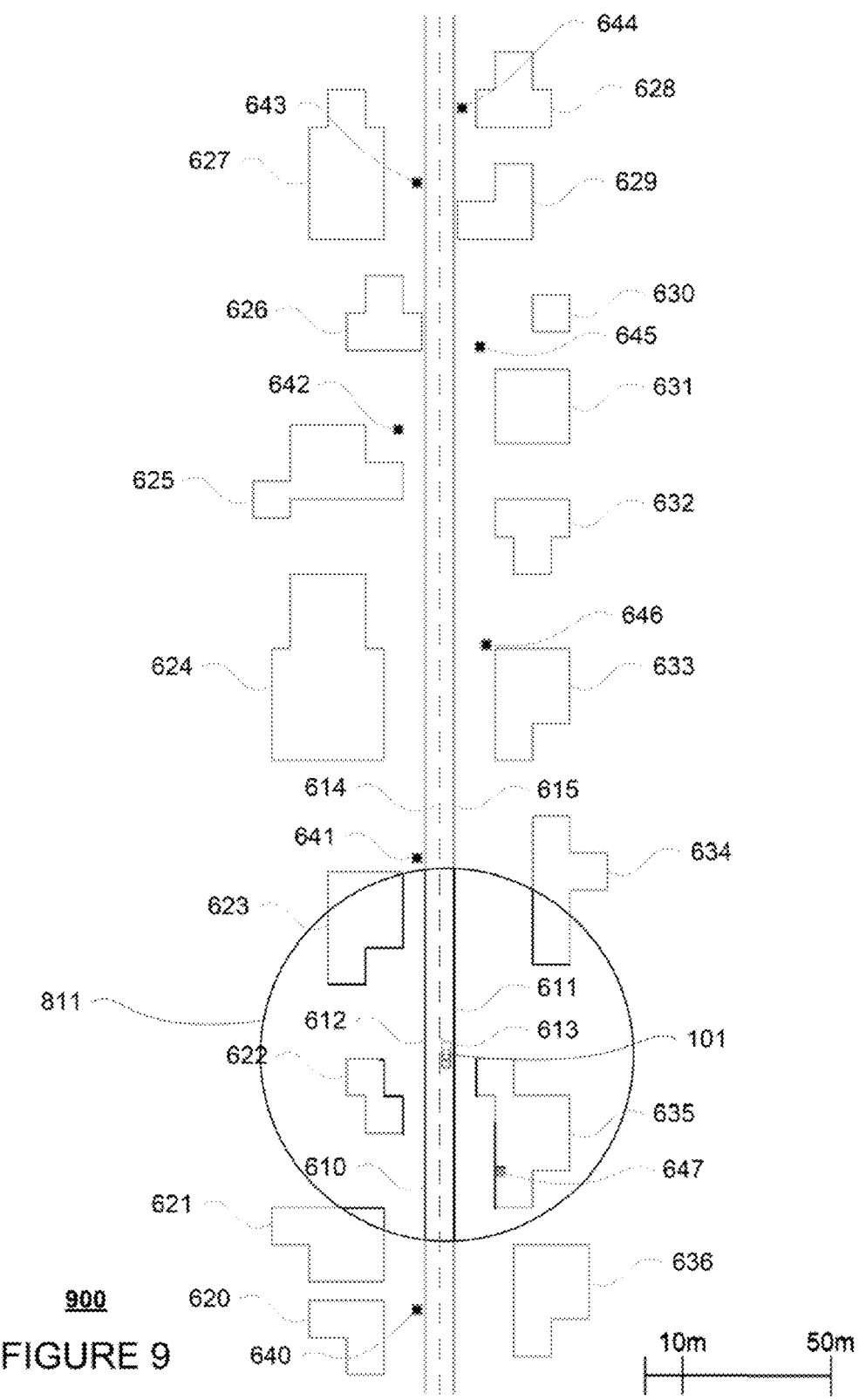
FIG. 9 is a comparison of the sensor data of FIG. 8 with the example map data of FIG. 6.

FIG. 9 is an example 900 of the environmental map 811 as compared to portion 600 of detailed map information 136. In this example, computer 110 may use the objects from the environmental map 811 and correlate those objects to objects of the map information with 25 cm accuracy, out to a range of 50 m. As the detailed map information may include coordinates. Regardless of the number or density of detected features, a pose estimate based on the alignment to the prior map could be off by nearly ⅓ of a degree in yaw. As a result, the location estimation from the first sensor may have a relatively high degree of inaccuracy that is unacceptable for autonomous driving.

In order to correct this error in the initial location estimation, data from a second sensor may be collected. For example, a second sensor, such as a laser or camera, having a longer range than the first sensor may detect an object outside of the range of the first sensor. Returning to FIG. 7, vehicle 101 is also associated with a second laser 311 as well as a camera 330 having ranges of approximately 200 meters for 30 degrees. Both of these sensors have fields of view that extend at least twice as far as the sensor field of laser 310 and at least three times as far as the sensor field 711 used to generate the initial environmental map.

The sensor data from the second sensor may be used to identify a reference object at a distance significantly farther from the autonomous vehicle than the range of the first sensor. In addition, this second sensor may have a longer range, but a narrower field of view. As an example, a laser sensor can often see retroreflective material (such as freeway signs or roadway markers) at a much greater range than it detects non-retroreflective objects. Thus, if the second sensor were a laser sensor, the autonomous vehicle's computer could search the laser data for these retroreflective objects at distances well beyond the range of the first sensor. In another example, if the second sensor were a camera, the computer could search the camera's images for retroreflective objects or bright lights at such distances.

Figure 10:
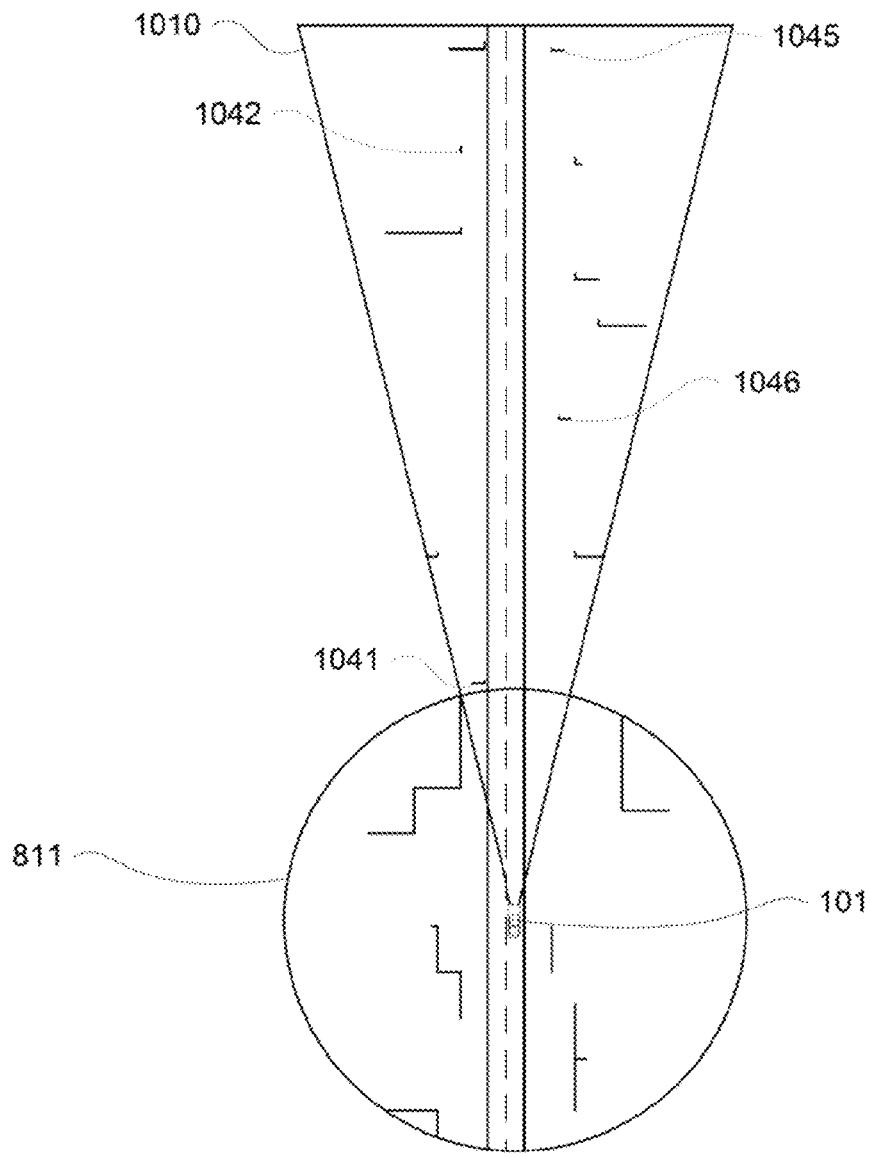
FIG. 10 is another diagram of example sensor data in accordance with aspects of the disclosure.

In the example of vehicle 101, if the second sensor is a camera such as camera 330 or a laser such as laser 311, the second sensor may be able to generate data a bright light or a retroreflective object outside of the range of the laser 310. Returning to FIG. 7, sensor fields 410 and 430 may include objects 541, 542, 545, and 546 having such properties. FIG. 10 is an example 1000, of data 1010 collected from laser 311 or camera 330 within sensor fields 410 or 430 while vehicle 101 is at the location of FIG. 7. As with the Example of FIG. 8, FIG. 10 demonstrates that the data covers only locations within the line of sight of the laser 311 or camera 330. Thus FIG. 10, computer 110 receives data for reference objects 1041, 1042, 1045, and 1046 corresponding to only a portion of objects 541, 542, 545, and 546 (shown in FIG. 5). Each of reference objects 1041, 1042, 1045, and 1046 having retroreflective, high intensity, or high brightness characteristics. In this example, the retroreflective, intensity, and brightness characteristics of reference objects 1041, 1042, 1045, and 1046 which makes these objects reference objects is based on the limitations of the second sensor, for example, camera 331 or laser 311. In other words, whether or not an object is a reference object is dependent upon whether the particular second sensor is able to identify a characteristic of that reference object at longer ranges.

The autonomous vehicle may determine the location of one or more of these reference objects identified from the sensor data beyond the range and field of view of the first sensor used to generate the environmental map. For example, the location relative to the autonomous vehicle (or the second sensor) may be determined from the laser data points or from two or more images using the location of the camera when the images were captured. The one or more identified reference objects may then be correlated to the reference objects of the detailed map information. This correlation may then be used to identify the latitude, longitude, and altitude coordinate of the one or more reference objects. It is important that the object correlate to the detailed map information well, if not, that reference object may be ignored or not used to correct the location and heading of the vehicle. Once the latitude, longitude, and altitude coordinates of the identified references objects are determined, the autonomous vehicle's latitude, longitude, altitude coordinates and heading may be corrected.

In other words, the second sensor may provide the location of a reference object relative to the sensor (and implicitly the vehicle). Given this relative information, one can compute the expected location of the object given the location of the vehicle, or the expected location of the vehicle given the location of the object. Since the detailed map information includes the "true" location of the object, and the sensor tells provides the estimated location of the object (given the current estimate of the vehicle's location), the error between the map location and the sense location of the object tells the vehicle's computer how the computer should adjust the vehicle's location.

If more than one reference object is identified and correlated to the detailed map information, all of these references objects may be used. If only a single reference object is used, then the one farthest from the vehicle would be most useful. If only a subset of all detections could be used, then along with the one farthest from the vehicle, there would also be a preference for a difference in bearing to the vehicle.

Figure 11:
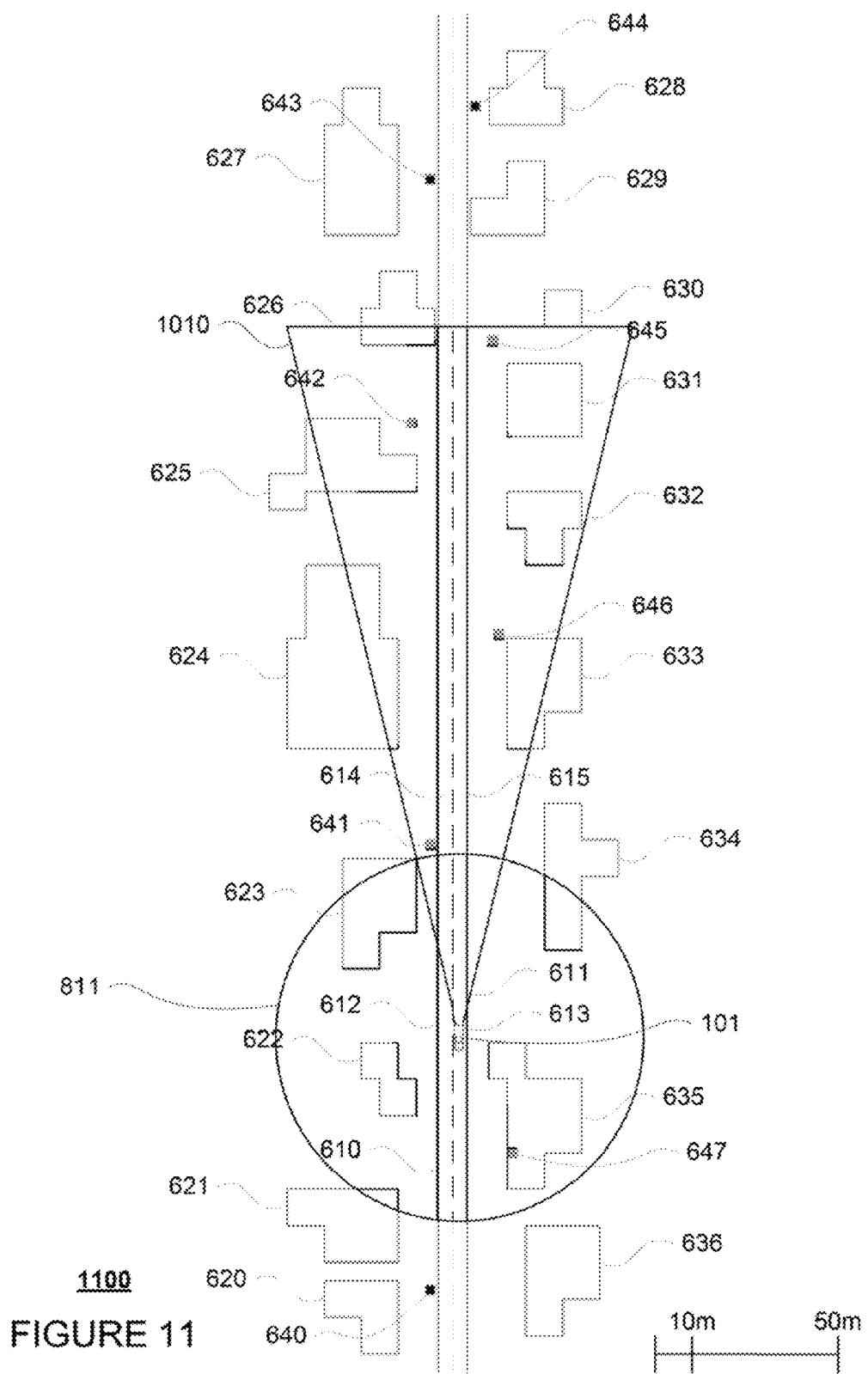
FIG. 11 is a comparison of the sensor data of FIG. 10 with the example map data of FIG. 6.

FIG. 11 is an example 1100 of sensor data 1010 (from a camera or a laser) as compared to portion 600 of detailed map information 136. In this example, computer 110 may identify data for reference objects 1041, 1042, 1045, and 1046 all of which are beyond the range and field of view of laser 310 used to generate the environmental map 811. The computer may correlate data to portions of reference objects 641, 642, 645, and 646 of the portion 600 of detailed map information 136. The location of each of these reference objects may then be used to correct the initial estimation location and heading.

As an example, if an autonomous vehicle detects a single reference object at or near a range of 200 meters and correlates it to the detailed map information, the error in the heading estimation discussed above may be reduced to less than 1/10 of a degree. In another example, if a sign is detected at 100 meters and the sign is at a certain location in the detailed map information, then the autonomous vehicle's computer can make a much more accurate estimate of what the heading (roll, pitch, yaw) of the autonomous vehicle is as compared to if the sign was only detected at 50 meters. This is because while the noise in the sign detection from the sensor data may be relatively high at longer ranges, the noise in the correlation between the sensor data and the detailed map information (which is usually based on the size of the sign rather than the distance) may be much smaller when the sign is farther away than when it is closer. Thus, the constraint on the autonomous vehicle's heading is much tighter for the 100 meter case than for the 50 meter case. Furthermore, with a more accurate heading, the autonomous vehicle's computer can also correct the autonomous vehicle's location.

Figure 12:
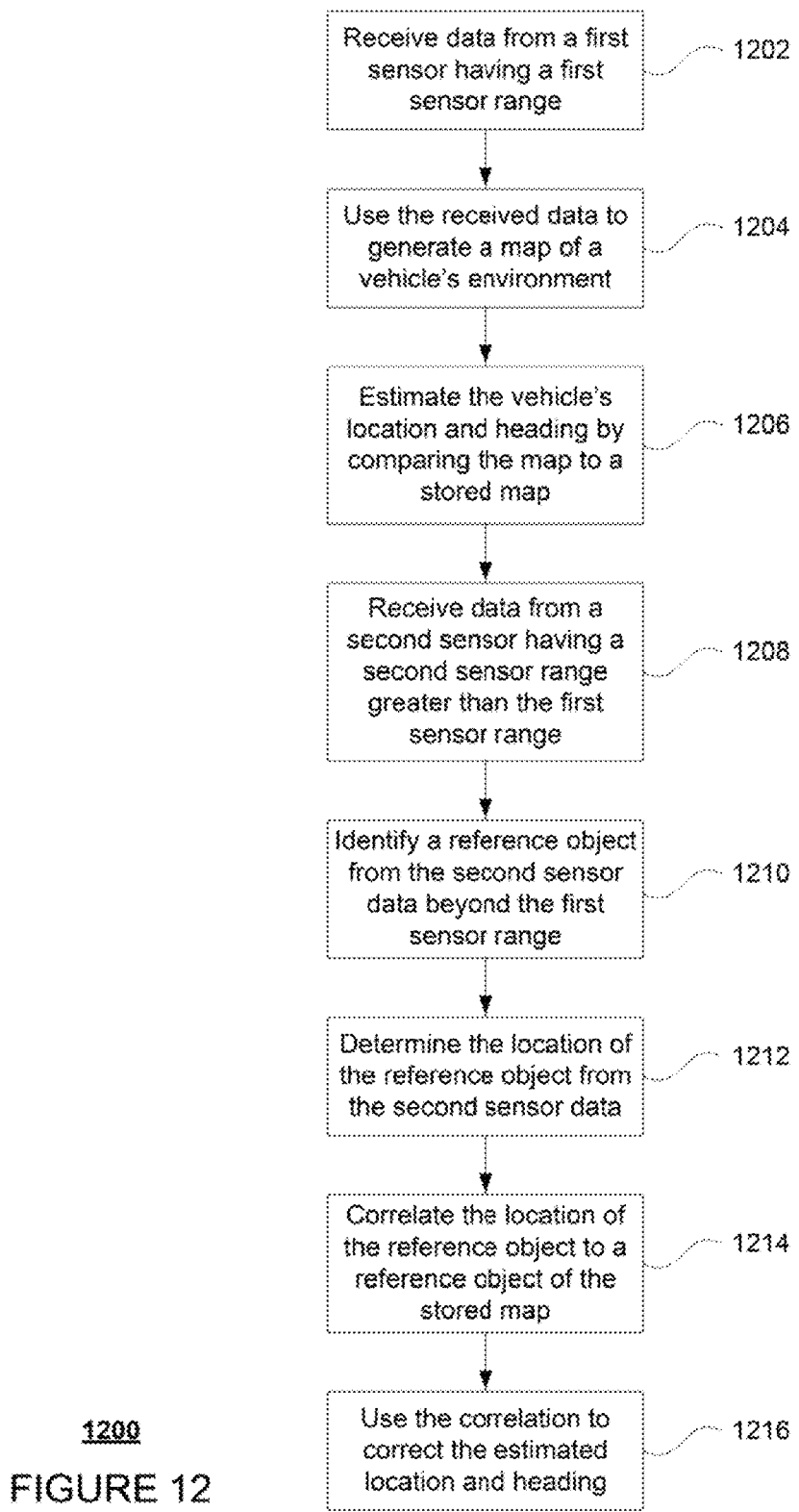
FIG. 12 is an example flow diagram in accordance with aspects of the disclosure.

FIG. 12 is a flow diagram 1200 of some of the aspects described above. The steps of flow diagram 1200 may be performed, for example, by a computer of an autonomous vehicle such as computer 110 of vehicle 101. In this example, the computer receives data from a first sensor having a first sensor range at block 1202. As noted above, this first sensor may be a laser having a 360 degree field of view. This received data is used to generate a map of a vehicle's environment at block 1204. The vehicle's location and heading are estimated by comparing the map to a stored map at block 1206. The computer also receives data from a second sensor having a second range greater than the first sensor range at block 1208. This second sensor data is used to identify a reference object having particular retroreflective, brightness, or intensity characteristics located beyond the first sensor range at block 1210. The location of the reference object relative to the autonomous vehicle (or the second sensor) is determined from the data from the second sensor data at block 1212. The determine location of the reference object is correlated to a reference object of the stored map at block 1214. The correlation is then used to correct the estimated location and heading at block 1216.

While no particular minimum difference in the ranges of the first and second sensors is required, the larger the difference in ranges, the more effective the geographic location correction features described herein may be. As an example, the features described herein would work with one sensor that was only a few meters longer in range than another, though greater correction benefits would be achieved with a greater difference in the ranges.

As an alternative, rather than using two sensors, the similar approach may be utilize the same physical sensor, but a different sensor processing approach, to create two "virtual" sensors. For example, using the aforementioned example of laser 330 having an 80 meter range but only receives a sufficient density of data points for generating a useful environmental map out to 50 meters, a first processing technique (e.g. generating an environmental map) may be applied out to 50 meters and a second processing technique (e.g. identifying reference objects having particular retroreflective, brightness or intensity characteristics) may be applied from 50 to 80 meters. The first processing technique may be a first virtual sensor, and the second technique may be a second virtual sensors. These first and second virtual sensors may thus be used as described above in order to determine and correct location and heading estimates.

In addition, some steps may also be performed in a continuous loop. As an example, the correlation from the environmental map data to the detailed map information need not be used to determine the vehicle's location from scratch each time. Rather, the results of previous geographic location determinations may also be used as input in order to further refine the position and heading estimates.

Although the geographic locations described herein are expressed in terms of latitude, longitude, and altitude, other global coordinate systems, such as Universal Transverse Mercator (UTM), may also be used.

Using the features described above, it may be possible to use much longer range observations of specific features to generate a more accurate overall location result. In addition, by exploiting the behavior of specific sensors the autonomous vehicle may detect a smaller number of features but get improved accuracy in its location and heading estimation. This is particularly important for systems that rely on very accurate estimates of their location and heading, such as high speed vehicles on roads, advanced driver assistance systems, vehicles that are generating information to be used in mapping, or vehicles that rely on the location and heading estimation to detect important objects using the detailed map information (such as detecting the color of known traffic lights). Because of this, the autonomous vehicle may both get improved location and heading estimation accuracy, but could also reduce the amount of data stored in a map for performing localization.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   receiving data collected by a first sensor while a vehicle is driving on a roadway, the first sensor having a first sensor range;
   using the received data from the first sensor to generate a map of the vehicle's environment within the first sensor range;
   estimating, by a processor, the vehicle's geographic location and heading by comparing the generated map to a stored map identifying the geographic locations of objects including reference objects having particular retroreflective, brightness, or intensity characteristics;
   receiving data collected by a second sensor while the vehicle is driving on the roadway, the second sensor having a second sensor range greater than the first sensor range;
   identifying a reference object having a particular retroreflective, brightness, or intensity characteristic from the data collected by the second sensor outside of the first sensor range;
   correlating the identified reference object to a reference object of the stored map based on the particular retroreflective, brightness, or intensity characteristic; and
   using the correlation to refine the estimated heading of the vehicle.

2. The method of claim 1, wherein
   the estimated geographic location includes at least one of (1) latitude, longitude and altitude coordinates and (2) Coordinated Universal Time coordinates.

3. The method of claim 1, further comprising using the correlation to refine the estimated geographic location of the vehicle.

4. The method of claim 1, wherein the first sensor is a laser and the second sensor is a different laser or a camera.

5. The method of claim 1, wherein estimating the vehicle's geographic location and heading is further based on a previous geographic location and heading estimate.

6. A method of claim 1, wherein the first sensor and the second sensor are the same sensor.

7. A method comprising:
   generating, by one or more processors, a map of an environment of a vehicle using a first data set collected from within a sensor range;
   estimating, by the one or more processors, a heading of the vehicle relative to objects in the generated map, each object having a geographic location correlated to a known geographic location of a first data reference object in a stored map, the stored map identifying known geographic locations and particular retroreflective, brightness, or intensity characteristics of a plurality of reference objects;
   identifying, by the one or more processors, a second data reference object having a particular retroreflective, brightness, or intensity characteristic from a second data set collected from outside of the sensor range;
   determining, by the one or more processors, a geographic location of the identified second data reference object by correlating the identified second data reference object to a reference object of the stored map based on the particular retroreflective, brightness, or intensity characteristic, the reference object of the stored map having a known geographic location; and
   updating, by the one or more processors, the estimated heading of the vehicle using the geographic location of the identified second data reference.

8. The method of claim 7, wherein the first data set is collected by a first sensor and the second data set is collected by a second sensor.

9. The method of claim 7, wherein the identified second data reference object is one of a plurality of second data reference objects from the second data set that is farthest from an estimated location of the vehicle.

10. The method of claim 7, wherein updating the estimated heading of the vehicle further uses at least one of a previously estimated heading of the vehicle, previously determined geographic location of objects, and previously determined geographic location of second data reference objects.

11. The method of claim 7, wherein the first data set and the second data set are collected by one sensor.

12. The method of claim 11, wherein generating the map of the environment of the vehicle further comprises applying a first processing technique to the first data set.

13. The method of claim 12, wherein identifying a second data reference object further comprises applying a second processing technique to the second data set, the second processing technique being different from the first processing technique.

14. The method of claim 11, wherein the sensor is a laser.

15. The method of claim 7, further comprising:
   estimating, by the one or more processors, a location of the vehicle relative to the objects in the generated map; and
   updating, by the one or more processors, the estimated location of the vehicle using the geographic location of the identified second data reference.

16. A system comprising:
   one or more sensors configured to collect data while a vehicle is driving on a roadway;
   a memory storing a map identifying geographic locations and particular retroreflective, brightness, or intensity characteristics of a plurality of reference objects; and
   one or more processors configured to:
      generate a map of an environment of a vehicle using a first data set collected from within a sensor range;
      estimate a heading of the vehicle relative to objects in the generated map, each object having a geographic location correlated to a known geographic location of a first data reference object in the stored map;
      identify one or more second data reference objects from a second data set collected from outside of the sensor range, each second data reference object having a particular retroreflective, brightness, or intensity characteristic;
      determine a geographic location of at least one identified second data reference object by correlating each at least one second data reference object with a reference object of the stored map based on the particular retroreflective, brightness, or intensity characteristic, the reference object of the stored map having a known geographic location; and
      update the estimated heading of the vehicle using the geographic location of each at least one identified second data reference.

17. The system of claim 16, wherein the first data set is collected by a first sensor and the second data set is collected by a second sensor.

18. The method of claim 16, wherein the at least one identified second data reference object includes a first reference object that is farthest from an estimated location of the vehicle.

19. The method of claim 17, wherein the at least one identified second data reference object further includes a second reference object that has a different bearing to the vehicle than the first reference object.

20. The method of claim 7, wherein the first data set and the second data set are collected by one sensor.

* * * * *